United States Patent
Itoh

(10) Patent No.: US 8,396,292 B2
(45) Date of Patent: Mar. 12, 2013

(54) IMAGE PROCESSING APPARATUS, IMAGE PROCESSING METHOD AND COMPUTER-READABLE MEDIUM

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 534 days.

(21) Appl. No.: 12/708,995

(22) Filed: Feb. 19, 2010

(65) Prior Publication Data
US 2011/0013832 A1    Jan. 20, 2011

(30) Foreign Application Priority Data
Jul. 15, 2009    (JP) ................................ 2009-166810

(51) Int. Cl.
*G06K 9/00* (2006.01)
(52) U.S. Cl. ...................................... 382/167
(58) Field of Classification Search ........................ None
See application file for complete search history.

(56) References Cited

U.S. PATENT DOCUMENTS

| | | | |
|---|---|---|---|
| 5,825,917 A | 10/1998 | Suzuki | |
| 7,085,413 B2 * | 8/2006 | Huang et al. | 382/163 |
| 8,040,569 B2 * | 10/2011 | Hashii et al. | 358/3.27 |
| 8,179,576 B2 * | 5/2012 | Hayashi | 358/520 |
| 8,194,296 B2 * | 6/2012 | Compton et al. | 358/500 |
| 2005/0266395 A1 * | 12/2005 | Gholap et al. | 435/4 |
| 2008/0069442 A1 | 3/2008 | Itoh | |
| 2009/0046313 A1 * | 2/2009 | Minamino | 358/1.13 |

FOREIGN PATENT DOCUMENTS

| JP | A-6-103371 | 4/1994 |
|---|---|---|
| JP | A-154179 | 6/1996 |
| JP | A-8-202328 | 8/1996 |
| JP | A-2008-65803 | 3/2008 |

* cited by examiner

*Primary Examiner* — Vikkram Bali
(74) *Attorney, Agent, or Firm* — Oliff & Berridge, PLC

(57) ABSTRACT

An image processing apparatus includes a selecting unit, a boundary strength calculating unit and a color replacing unit. When M representative colors include first and second colors, and N intermediate color between the first and second colors, the selecting unit selects the first and second colors and the N intermediate color. M and N denote natural numbers, $N \geq 1$ and $N<M-2$. The boundary strength calculating unit calculates a boundary strength indicating a color or brightness difference at a pixel of the image to be processed. The color replacing unit determines replacement color candidates for the pixel from among the first color, the second color and the N intermediate color, and replaces a color of the pixel with any of the replacement color candidates. The replacement color candidates are determined in accordance with the boundary strength of the pixel calculated by the boundary strength calculating unit.

20 Claims, 9 Drawing Sheets

β: SMALL

β: LARGE

|  |  | DETERMINATION BASED ON BOUNDARY STRENGTH | |
|---|---|---|---|
|  |  | BOUNDARY PART | PART OTHER THAN BOUNDARY |
| DETERMINATION REGARDING FOREGROUND | FOREGROUND | NO INTERMEDIATE COLOR | INTERMEDIATE COLOR IS PRESENT |
| | BACKGROUND | NO INTERMEDIATE COLOR | INTERMEDIATE COLOR IS PRESENT (BACKGROUND COLOR) |

BLACK FIGURE  GRAY FIGURE

GRAY

FIG. 10

|  |  | DETERMINATION BASED ON BOUNDARY STRENGTH | | |
|---|---|---|---|---|
|  |  | HIGH | MIDDLE | LOW |
| DETERMINATION REGARDING FOREGROUND | FOREGROUND | BLACK, WHITE | GRAY 1, WHITE | BLACK, GRAY 1, GRAY 2, WHITE |
|  | BACKGROUND | BLACK, WHITE | GRAY 1, WHITE | GRAY 2, WHITE |

IMAGE PROCESSING APPARATUS, IMAGE PROCESSING METHOD AND COMPUTER-READABLE MEDIUM

CROSS-REFERENCE TO RELATED APPLICATIONS

This application is based on and claims priority under 35 USC 119 from Japanese Patent Application No. 2009-166810 filed Jul. 15, 2009.

BACKGROUND

Technical Field

The present invention relates to an image processing apparatus, an image processing method and a computer-readable medium storing a program that causes a computer to execute image processing.

SUMMARY

According to an aspect of the invention, an image processing apparatus includes a selecting unit, a boundary strength calculating unit and a color replacing unit. When M representative colors include first and second colors, and N intermediate color between the first and second colors, the selecting unit selects the first color, the second color and the N intermediate color. M and N denote natural numbers, N≧1 and N<M−2. The boundary strength calculating unit calculates a boundary strength indicating a color difference or brightness difference at a pixel of the image to be processed. The color replacing unit determines replacement color candidates for the pixel from among the first color, the second color and the N intermediate color, and replaces a color of the pixel with any of the replacement color candidates. The replacement color candidates are determined in accordance with the boundary strength of the pixel calculated by the boundary strength calculating unit.

BRIEF DESCRIPTION OF THE DRAWINGS

Exemplary embodiments of the invention will be described in detail below based on the drawings, wherein:

FIG. 10 is a table for explaining another example of the determination criterion for selection of the replacement color candidates.

DETAILED DESCRIPTION

Figure 1:
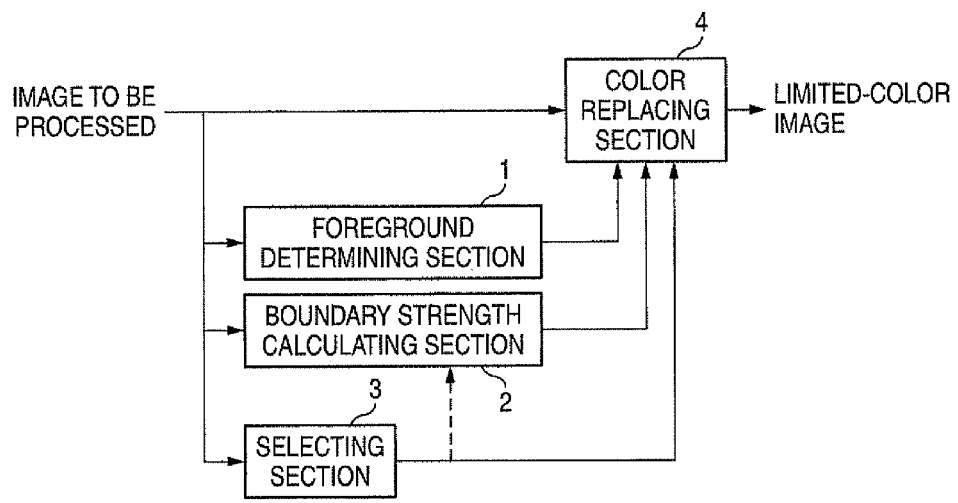
FIG. 1 is a configuration diagram showing one exemplary embodiment of the invention.

FIG. 1 is a configuration diagram showing one exemplary embodiment of the invention. In FIG. 1, reference numeral 1 denotes a foreground determining section, reference numeral 2 denotes a boundary strength calculating section, reference numeral 3 denotes a selecting section, and reference numeral 4 denotes a color replacing section. In the following description, it is assumed that, in executing a color limitation process for limiting the number of colors in an image to be processed to M representative colors, the M representative colors are extracted from the image to be processed in advance, for example, by a method described in US 2008/0069442 A (corresponding to JP2008-65803 A) or are given in advance.

The foreground determining section 1 determines as to whether a pixel to be replaced by the color replacing section 4 is a pixel in a foreground or a pixel in a background, and passes a determination result to the color replacing section 4. The determining of the foreground or the background may be made by any known method.

The boundary strength calculating section 2 calculates, for the pixel to be replaced by the color replacing section 4, a boundary strength indicating a color difference or a brightness difference based on the image to be processed. If the image to be processed is a monotone image, the boundary strength calculating section 2 may calculate a value indicating to what extent there is a difference in brightness and set the calculated value to the boundary strength. If the image to be processed is a color image, the boundary strength calculating section 2 may calculate, as the boundary strength, a value indicating to what extent there is a color difference. For example, the boundary strength calculating section 2 may calculate, for respective color components, values each indicating a difference in density, and set the calculated values to the boundary strengths. Alternatively, the boundary strength calculating section 4 may calculate boundary strengths of first and second colors, which are selected by the selecting section 3 or are set in advance, by using information about the first and second colors. The boundary strength(s) may be calculated by executing a superposition operation for pixels in a local region having a preset size and including a pixel to be replaced, more specifically, a known method such as a sobel filter, a primary differential filter or a secondary differential filter. In the following description, it is assumed that a greater value is obtained as the boundary strength as a color difference is larger in the local region.

When M representative colors include first and second colors and N intermediate colors between the first and second colors, the selecting section 3 selects the first color, the second color and the N intermediate color (M and N denote natural numbers, N≧1 and N<M−2). The first and second colors may be selected in response to the pixel to be replaced by the color replacing section 4 or a color of a pixel region or may be given in advance. For example, based on a color histogram of a local region having a predetermined size and including the pixel to be replaced by the color replacing section 4, it may be determined what color(s) are used in the region, and then the first and second colors may be selected.

Alternatively, a combination of the first and second colors may be selected from the M representative colors in order. If there is an intermediate color between the first and second colors, a combination of the first and second colors and the intermediate color may be selected. If there is an intermediate color, one or more combination set may be collectively selected. Information about the color selected by the selecting section 3 is sent to the color replacing section 4. Also, if the boundary strength calculating section 2 requires the first and second colors, the information about them may be sent to the boundary strength calculating section 2.

The color replacing section 4 replaces a color of each pixel in the image to be processed by any of the representative colors. Basically, the color replacing section 4 replaces a color of each pixel by any of the representative colors which has the smallest distance to the color of each pixel in a color space. For example, for a boundary between the first and second colors in an image plane, the color replacing section 4 determines the first and second colors as replacement color candidates so that colors of pixels in the boundary are replaced by the first or second color but not by an intermediate color therebetween, and replaces the color of each pixel in the boundary by any of the thus-determined replacement color candidates. There are, for example, a boundary between the first color and the intermediate color and a boundary between the second color and the intermediate color. In these cases, the color replacing section 4 determines the first color and the intermediate color or the second color and the intermediate color as the replacement color candidates, and replaces a color of each pixel in the boundary by any of the thus-determined replacement color candidates. The color replacing section 4 may determine what boundary each boundary is, based on the boundary strength calculated by the boundary strength calculating section 2. For this determination based on the boundary strength, the color replacing section may control a threshold value for this determination in accordance with an internal division ratio in which the intermediate color(s) divide a distance between the first and second colors in a color space. The color replacing section 4 may determine if a pixel in interest constitutes a boundary in the image to be processed, based on the boundary strength of the pixel in interest and a threshold value.

Also, the color replacing section 4 may determine as to whether the color of each pixel to be replaced is (i) a color to be replaced by any of the first color, the second color, and the intermediate color(s), which are selected by the selecting section 3, (ii) a color to be replaced by using any of plural combinations of the first color, the second color and the intermediate color(s) if the plural combinations are selected, or (iii) a color to be replaced by another representative color. The color replacing section 4 may determine a color or color tendency of a local region having a predetermined size and including the pixel to be replaced based on a characteristic of the local region such as a histogram distribution in a color space and/or a vector indicating a color change in the color space, and then make the above determination regarding the color of each pixel to be replaced in accordance with the color or color tendency of the local region. For example, if the boundary strengths are calculated for the respective color components by the boundary strength calculating section 2, for example, a vector having the boundary strengths of the respective color components as its components may be used as the vector indicating the color change. The color replacing section 4 may calculate a color change direction in the color space based on the vector, specify the first color and the second color, and furthermore, the intermediate color(s), if any, determine the replacement color candidates, and replace the color of each pixel to be replaced as described above.

In addition, the color replacing section 4 may determine the replacement color candidates in consideration of the result of the determination, made by the foreground determining section 1, as to whether the pixel to be replaced is the foreground or the background. For example, if the foreground determining section 1 determines that a certain pixel to be replaced is in the foreground, the color replacing section 4 may include a color, which is used in the foreground, in the replacement color candidates. Also, if the foreground determining section 1 determines that a certain pixel to be replaced is in the background, the color replacing section 4 may include a color, which is used in the background, in the replacement color candidates. For example, if the foreground determining section 1 determines that a certain pixel to be replaced is in the background, the color replacing section 4 may be configured to replace a color of the certain pixel by a background color (e.g., a second color if the second color is the background color).

Figure 2:
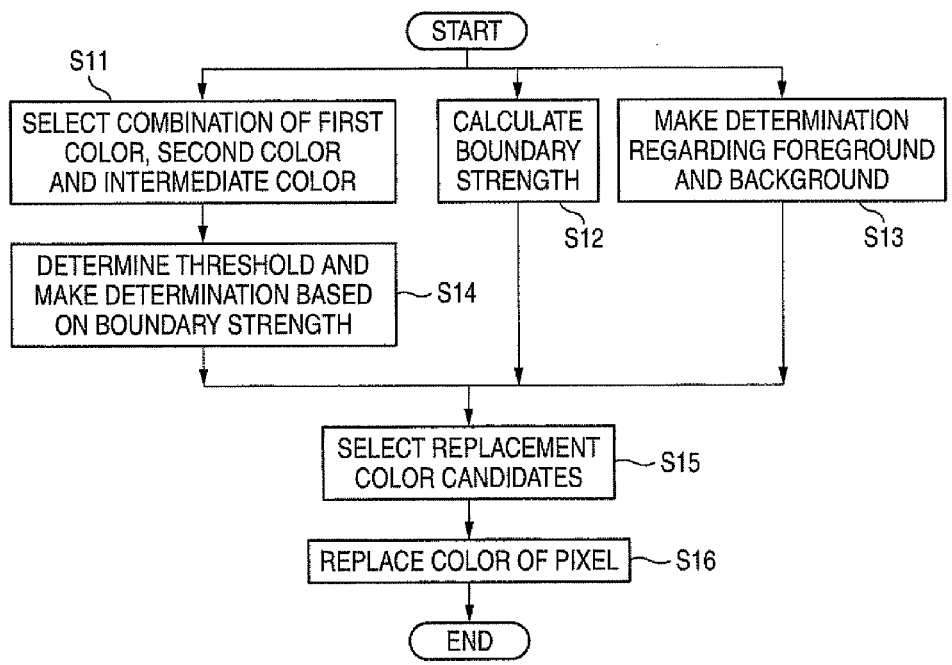
FIG. 2 is a flowchart showing an example of an operation according to the exemplary embodiment of the invention.

FIG. 2 is a flowchart showing an example of an operation according to the exemplary embodiment of the invention. M representative colors for use in limiting the number of colors in an image to be processed are given in advance or are extracted in advance from the image to be processed.

At S11, the selecting section 3 selects a first color, a second color and an intermediate color between the first and second colors from the M representative colors. The first and second colors may be given in advance or may be acquired from pixels in a region being preset and including a pixel to be replaced in the image to be processed. For example, it may be determined which color is used in a local region having a predetermined size and including the pixel to be replaced by the color replacing section 4, based on a color histogram of the local region, and the first and second colors may be selected. Also, the second color may be a background color, and it is determined if an intermediate color is present while the first color is selected from the other representative colors.

Figure 3A:
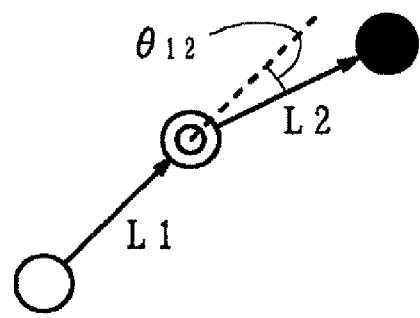
FIGS. 3A to 3C are views for explaining examples of a method for determining an intermediate color.
Figure 3B:
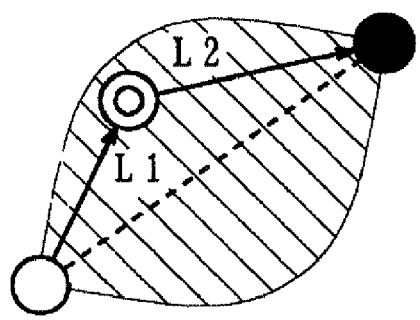
Figure 3C:
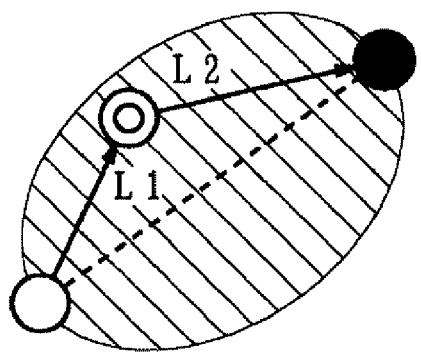

FIGS. 3A to 3C are views for explaining examples of a method of determining an intermediate color. In FIGS. 3A to 3C, a black circle indicates the first color, a white circle indicates the second color, and a double circle indicates a candidate for the intermediate color. In the example shown in FIG. 3A, if an angle $\theta_{12}$ formed by a vector L1 from the second color to the candidate for the intermediate color and a vector L2 from the candidate for the intermediate color to the first color is equal to or smaller than a predetermined angle $\theta_c$ ($\theta_{12} \leq \theta_c$) in the color space, it is determined that the candidate for the intermediate color is an intermediate color. The angle $\theta_{12}$ may be calculated by the following equation.

$$\cos\theta_{12} = \frac{L1 \cdot L2}{|L1||L2|}$$

As another example, if the angle $\theta_{12}$ is equal to or smaller than a function value of a predetermined angle $\theta_c$, it may be determined that the candidate for the intermediate color is an intermediate color. For example, if the following conditional expression is satisfied, it may be determined that the candidate for the intermediate color is an intermediate color.

$$\theta_{12} \leq \frac{\alpha \cdot \theta_c}{(|L1||L2|)^\beta}$$

where α and β denote constants. In this case, the angle $\theta_{12}$ may be calculated by the following equation.

$$\cos\theta_{12} = \frac{L1 \cdot L2}{|L1||L2|}$$

The constant β controls a color region which is to be determined as the intermediate color. In FIGS. 3B and 3C, shaded portions indicate regions which are to be determined as the intermediate color. Here, FIG. 3B shows an example in which the value of β is smaller as compared with the example shown in FIG. 3C.

Thus, a combination of the first color, the second color and the intermediate color is obtained. In some cases, no intermediate color is present in the representative colors. In those cases, the selecting section 3 may output, as the replacement candidate colors, the first color and the second color or a representative color corresponding to a single color if an image to be processed only has a single color locally.

In the above description, the first color and the second color are determined, and the intermediate color therebetween is obtained. However, combinations of a first color, a second color and an intermediate color is obtained by checking if the intermediate color between the first and second colors is present while selecting the first and second colors the presence, and then one combination corresponding to a pixel to be replaced may be selected from among the obtained combinations. A combination whose intermediate color is included in the color region shown in the shaded portion of FIG. 3B or 3C may be selected, for example. Even in this case, such a combination may not present. If it is the case, the first and second colors or a representative color corresponding to a single color may be output as the replacement candidate color as described above.

Returning to FIG. 2, at S12, the boundary strength calculating section 2 calculates a boundary strength of the pixel to be replaced by the color replacing section 4, based on the image to be processed. A filter process is performed for brightness or respective color components of the local region having the predetermined size and including the pixel to be replaced, for example, and the boundary strength may be calculated in a numeric value. At S11, the selected first and second colors may be received, and a boundary strength may be calculated for a vector direction that connects the first and second colors in the color space. Specifically, a boundary strength may be calculated by obtaining how much a boundary strength of the local region is in the vector direction.

In parallel to the processes of S11 and S12, the foreground determining section 1 determines as to whether the pixel to be replaced by the color replacing section 4 is a pixel in the foreground or in the background, and sends a determination result to the color replacing section 4 at S13.

At S14, if the combination of the first color, the second color and the intermediate color has been selected by the selecting section 3, the color replacing section 4 calculates a ratio (an internal division ratio) in which the intermediate color divides a distance between the first and second colors in the color space, and determines a threshold which is used in determination based on the boundary strength, in accordance with the internal division ratio. Then, the color replacing section 4 determines an extent of a color boundary based on the boundary strength calculated by the boundary strength calculating section 2 and the threshold thus determined. As the extent of the color boundary, the color replacing section 4 determines as to whether the pixel to be replaced is regarded as (i) a boundary between the first and second colors, (ii) a boundary between the first color and the intermediate color, or (iii) a boundary between the second color and the intermediate color. As a matter of course, if the number of the threshold is one, the color replacing section 4 determines as to whether or not the pixel to be replaced is regarded as the color boundary.

Figures 4, 5:
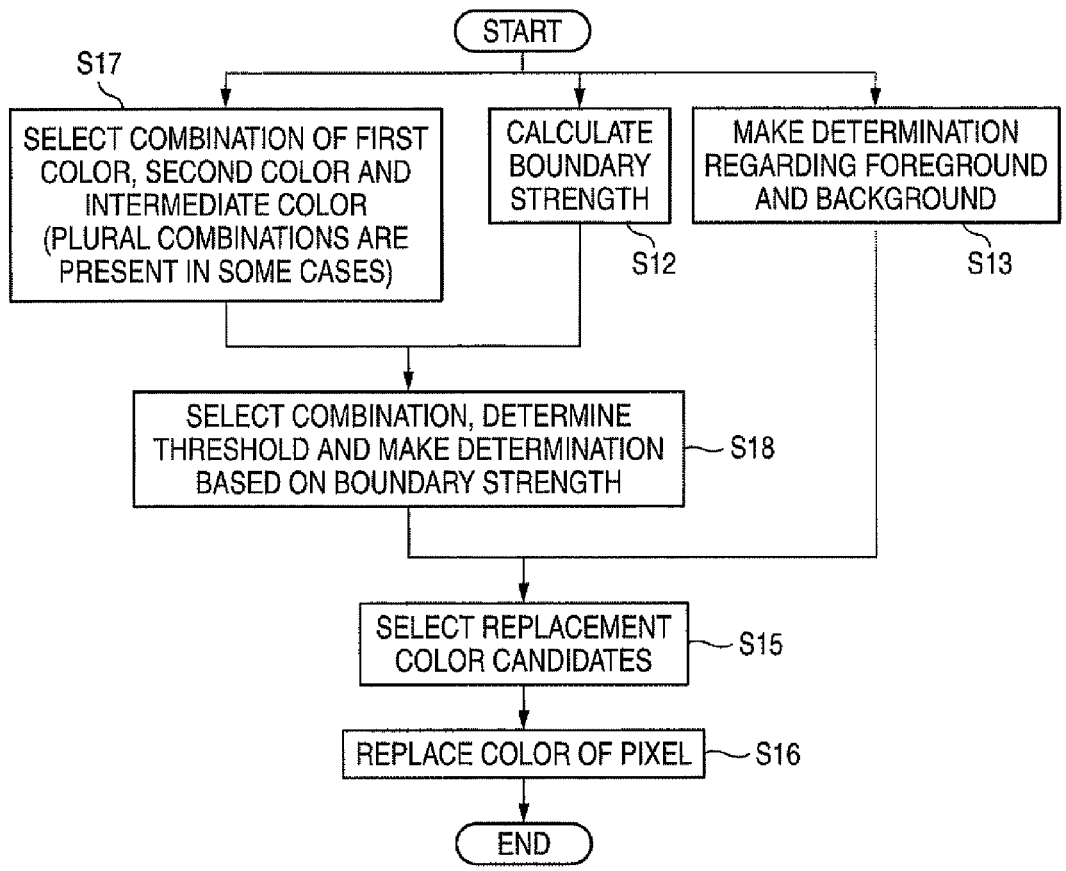
FIG. 4 is a table for explaining an example of a determination criterion for selection of a replacement color candidates.
FIG. 5 is a flowchart showing another example of the operation according to the exemplary embodiment of the invention.

At S15, furthermore, the color replacing section 4 selects replacement color candidates in accordance with the determination result regarding the color boundary which has been made at S14 and the determination result which has been made by the foreground determining section 1 at S13 and which indicates that the pixel is either in the foreground or in the background. FIG. 4 is a table for explaining an example of a determination criterion for selection of the replacement color candidates. The color replacing section 4 may select the replacement color candidates in accordance with a preset determination criterion, for example. In the example of the determination criterion in FIG. 4, there is shown the case where it is determined as to whether or not a pixel to be replaced constitutes a boundary, based on the boundary strength with the assumption that the number of threshold values for the boundary strength is one. If it is determined based on the boundary strength that the pixel to be replaced constitutes the boundary, the first and second colors excluding the intermediate color are set as the replacement color candidates irrespective of the foreground or the background. In the case where it is determined based on the boundary strength that the pixel to be replaced does not constitute the boundary, if the pixel to be replaced is in the foreground, the intermediate color is also set as the replacement color candidates as well as the first and second colors. Basically, if the pixel to be replaced is in the background and does not constitute the boundary, the first and second colors and the intermediate color may be set as the replacement color candidates. In this case, however, either the first color or the second color which corresponds to the background color may be set as the replacement color candidate because the pixel to be replaced is in the background region, for example. In the case where the selecting section 3 has selected no intermediate color, the first and second colors or a single color may be set as the replacement color candidates.

At S16, the color replacing section 4 replaces the color of the pixel to be replaced by any representative color of the replacement color candidates which have been selected at S15. The color replacing section 4 may replace the color of the pixel to be replaced by a representative color, of the replacement color candidates, having the smallest distance in the color space from the color of the pixel to be replaced, for example. For example, since the first and second colors have been selected as the replacement color candidates for the pixel which has been determined based on the boundary strength to constitute the boundary, the color of this pixel is replaced by any of the first and second colors. Therefore, even if blur occurs or a printing plate on an original is shifted in reading an image, colors of pixels in the color boundary are not replaced by the intermediate color, thereby reproducing the color boundary. In a boundary of a light color or the like, moreover, it is determined that pixels in the color boundary don't constitute the color boundary, and colors of those pixels in the color boundary are replaced by any of the replacement color candidates including the intermediate color(s).

Thereby, those colors are replaced by the intermediate color corresponding to the light color.

The process descried above is repetitively carried out for each pixel to successively replace the color of each of the pixels in the image to be processed. As a whole, the intermediate color is eliminated in a color boundary where the boundary strength takes a great value, and the color limitation process including the intermediate color is executed in the other regions. For the background part, if the replacement color candidates are limited to a representative color which corresponds to the background, an unnecessary color does not appear in the background.

FIG. 5 is a flowchart showing another example of the operation according to the exemplary embodiment of the invention. In the example shown in FIG. 2, the selecting section 3 selects the combination of the first color, the second color and the intermediate color, and the subsequent processes are then carried out. The invention is not limited to this example. The invention may be configured that if there are plural combinations of the first color, the second color and the intermediate color, the selecting section 3 may select plural sets of the first color, the second color and the intermediate color, and the color replacing section 4 may select any of the combinations for execution of the replacing process, for example. FIG. 5 shows an example in that case. In this example, M representative colors for limiting the number of colors of an image to be processed are given in advance or are extracted from the image to be processed in advance. Also, parts which are different from those described with reference to FIG. 2 will be mainly described below.

At S17, the selecting section 3 selects the first color and the second color from the M representative colors in order and determines as to whether or not an intermediate color(s) are present. As a method of determining the intermediate color, the method described with reference to FIG. 3 may be used. If the intermediate color(s) are present, the first and second colors selected in this case and one or more intermediate colors which are present are set as a combination. The process is repetitively executed while selection of the first and second colors is varied in order. Consequently, combination(s) of the first and second colors and the one or more intermediate colors are selected, if any. As a matter of course, such a combination is not present or plural combinations are selected, depending on the representative colors. The selected combination(s) are output to the color replacing section 4.

At S12, the boundary strength calculating section 2 calculates a boundary strength for a pixel to be replaced by the color replacing section 4, based on the image to be processed. At S13, the foreground determining section 1 determines as to whether the pixel to be replaced by the color replacing section 4 is a pixel in a foreground or a pixel in a background. These processes have been described with reference to FIG. 2.

At S18, the color replacing section 4 determines which combination of the first color, the second color and the intermediate color is used if plural combinations are selected by the selecting section 3, whether a color is replaced by using a single combination when the single combination is selected, or whether or not a color of the pixel to be replaced belongs to any of the combinations. In the determination, the color replacing section 4 may select such a combination that the color of the pixel to be replaced is included in the color region of the combination indicated by the shaded portion of FIG. 3B or 3C, for example. Alternatively, the color replacing section 4 may create a histogram distribution in the color space from colors of pixels in a local region having a predetermined size and including the pixel to be replaced and select a combination based on the histogram distribution. Further alternatively, the strength calculating section 2 may calculate the boundary strength for each color component, and a color changing direction in the color space may be calculated by using a vector having the boundary strengths of the respective color components as its components, and a combination may be selected in accordance with the color changing direction. In the case where a single combination is selected, the above determination may be made for the single combination, to determine as to whether or not the combination is used. As a matter of course, the color of the pixel to be replaced does not belong to any combination in some cases.

In the case where the color replacing section 4 selects the combination of the first color, the second color and the intermediate color, the color replacing section 4 obtains a ratio (an internal division ratio) in which the intermediate color divides a distance between the first color and the second color in the color space, and determines a threshold which is used in determination based on the boundary strength, in accordance with the internal division ratio. If there are plural intermediate colors, the color replacing section 4 may determine plural thresholds. Then, the color replacing section 4 determines an extent of a color boundary based on the boundary strength calculated by the boundary strength calculating section 2 and the threshold thus determined. As the extent of the color boundary, the color replacing section 4 determines as to whether the pixel to be replaced is regarded as (i) a boundary between the first color and the second color, (ii) a boundary between the first color and the intermediate color or (ii) a boundary between the second color and the intermediate color. As a matter of course, if the number of threshold is one, the color replacing section 4 determines as to whether or not the pixel to be replaced is regarded as the color boundary.

As described with reference to FIG. 2, at S15, the replacement color candidates are selected in accordance with the determination result regarding the color boundary which has been made at S14 and the determination result which indicates that the pixel to be replaced is either in the foreground or in the background and which has been made by the foreground determining section 1 at S13. If it has been determined at S18 that the color of the pixel to be replaced does not belong to any combination, a replacement color candidate(s) may be selected from the representative colors by a predetermined method. At S16, then, the color replacing section 4 replaces the color of the pixel to be replaced by any representative color of the replacement color candidates which have been selected at S16. The color replacing section 4 may replace the color of the pixel to be replaced by a representative color, of the replacement color candidates, having the smallest distance in the color space from the color of the pixel to be replaced, for example.

The process is repetitively carried out for each pixel to successively replace the color of each of the pixels in the image to be processed. Also, in the process, as a whole, the intermediate color is eliminated in a color boundary where the boundary strength takes a great value, and the color limitation process including the intermediate color is executed in the other regions. For the background part, if the replacement color candidates are limited to a representative color which corresponds to the background, an unnecessary color does not appear in the background.

Figure 6A:
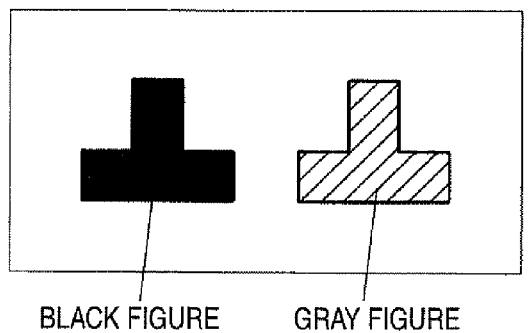
FIGS. 6A to 6F are views for explaining a first specific example of a limitation processing according to the exemplary embodiment of the invention.
Figure 6B:
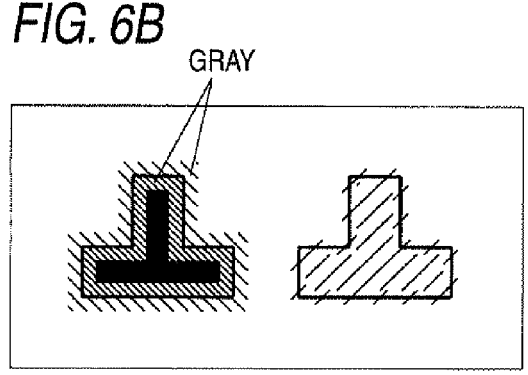

Some specific examples will be described below. FIGS. 6A to 6F are views for explaining a first specific example of the limitation processing according to the exemplary embodiment of the invention. FIG. 6A shows an example of an original, and illustrates a simple example in which a black figure and a gray figure are drawn. A gray region is shown by a shaded portion. FIG. 6B shows an image obtained by reading the original through an image reading device. It is assumed that the image is an image to be processed.

Figure 6C:
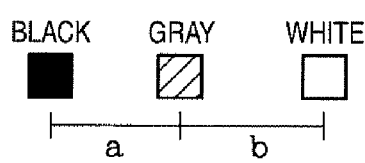

Representative colors for the color limitation are extracted from the image to be processed, and it is assumed that three colors, that is, white which is a background color, and black and gray which are figure colors are extracted as shown in FIG. 6C. In this example, it is assumed that a first color is black and that a second color is white. Since gray is present as an intermediate color between black and white, the selecting section 3 selects a combination of black, gray and white.

Figure 6D:
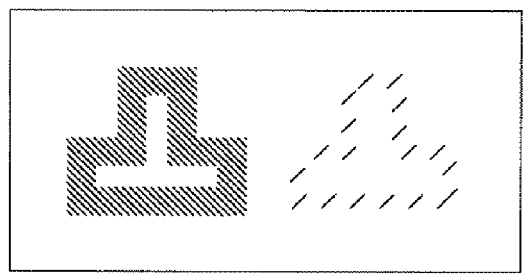

The boundary strength calculating section 2 calculates boundary strengths. Then, a different value from those in other parts is obtained in a region shown in FIG. 6D. FIG. 6D illustrates differences in boundary strength by intervals between slant lines. A boundary of the black figure takes a greater value in the boundary strength. A boundary of the gray figure takes a smaller value in boundary strength than the boundary of the black figure.

The color replacing section 4 sets a threshold for the boundary strength in accordance with an internal division ratio (a:b shown in FIG. 6C) in which gray (an example of the intermediate color) divides a distance in a color space between black (an example of the first color) and white (an example of the second color). Alternatively, a preset threshold may be used as the threshold. Then, the set threshold is compared with the boundary strength calculated by the boundary strength calculating section 2 to determine as to whether or not a pixel in interest is a pixel of the boundary.

The foreground determining section 1 determines as to whether each pixel in the image to be processed is either a pixel in a foreground or in a background, and passes a determination result to the color replacing section 4. In the example, pixels in the black and gray figure parts are determined to be in the foreground, and pixels in the other parts are determined to be in the background, and these determination results are sent to the color replacing section 4.

Figure 6E:
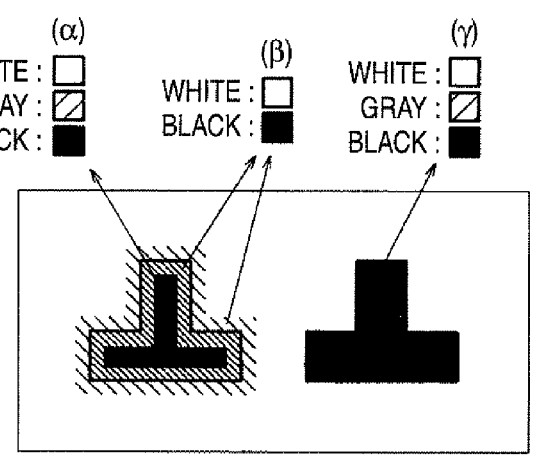

The color replacing section 4 selects replacement color candidates in accordance with the determination criterion shown in FIG. 4, the determination result for the boundary strength and the determination result made by the foreground determining section 1, for example. In FIG. 6E, the parts which have been determined to be the foreground by the foreground determining section 1 are shown in black, and parts which have been determined to be the boundary is shown by slant lines. Both of the black figure and the gray figure shown in FIG. 6A have been determined to be the foreground. Therefore, both of them are shown in black. Also, for the black figure, the boundary strength takes a great value in the boundary part. Therefore, the boundary part of the black figure is determined to be a boundary and is indicated by the slant lines. For the gray figure, the boundary strength takes a small value in the boundary part. Therefore, the boundary part of the gray figure is not determined to be the boundary. For this reason, the boundary part is not indicated by slant lines.

Firstly, since inner parts of the black figure and the gray figure are the foreground but not the boundary part, the intermediate color is also set as the replacement color candidates as well as the first color and the second color in accordance with the determination criterion shown in FIG. 4. In this example, therefore, the replacement color candidates are black, gray and white (($\alpha$) and ($\gamma$)). In the boundary part of the black figure, there are (i) a part which is the foreground and the boundary and (ii) a part which is the background and the boundary. For both of them, the first and second colors excluding the intermediate color are set as the replacement color candidates, in accordance with the determination criterion shown in FIG. 4. In this example, accordingly, black and white are the replacement color candidates are black and white (($\beta$)). For the background other than the boundary, black, gray and white may be set as the replacement color candidates or black and white may be set as the replacement color candidates.

Figure 6F:
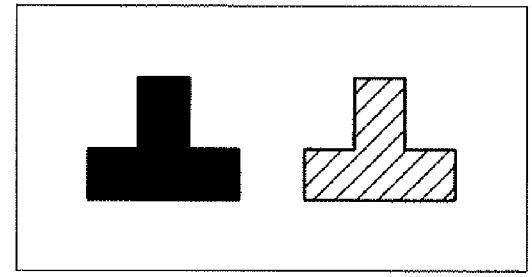

Then, the pixel in interest (pixel to be replaced) is replaced by any of the colors of the replacement color candidates. For example, the pixel in interest may be replaced by a color of a replacement color candidate which has the smallest distance in the color space. Thereby, the inner part of the black figure, the inner part of the gray figure and the background are replaced by "black", "gray" and "white", respectively. Pixels which are included in the black figure and which are in the boundary part of the black figure are replaced by "black" even if actual colors of the pixels are close to gray, because "gray" is excluded from the replacement color candidates. Also, pixels which are in the boundary part of the black figure and which are on the background side are replaced by "white" even if actual colors of the pixels are close to gray, because "gray" is excluded from the replacement color candidates. Thus, a result of the color limitation shown in FIG. 6F is obtained. As can be seen in FIG. 6F, a gray part appearing in the boundary in FIG. 6B is eliminated.

Figure 7A:
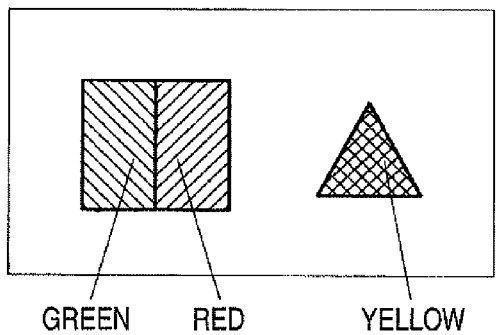
FIGS. 7A to 7E are views for explaining a second specific example of the limitation processing according to the exemplary embodiment of the invention.
Figure 7B:
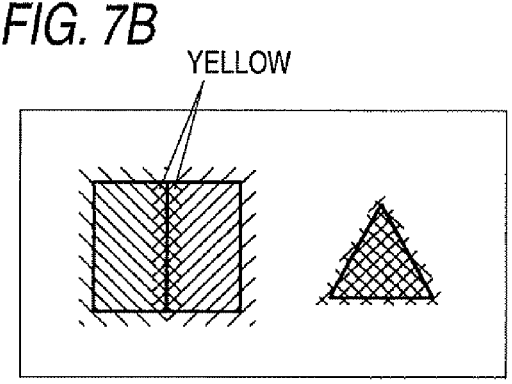

FIGS. 7A to 7E are views for explaining a second specific example of the limitation processing according to the invention. FIG. 7A shows an example of an original. As a simple example, it is assumed that red (R), green (G) and blue (B) are used as color components. In this example, figures in which green (G) and red (R) are adjacent to each other and a figure of yellow (Y) are drawn. For convenience of illustration, the different colors are indicated by different types of slant lines, respectively. FIG. 7B shows an image obtained by reading the original through an image reading device. It is assumed that the image is an image to be processed. Also, in a boundary in which green and red are adjacent to each other as well as in a boundary between each figure and a background, yellow which is obtained by mixing both of green and red appears. In the following description, explanation will be given on a process for the boundary between green and red.

Representative colors for a color limitation are extracted from the image to be processed. It is assumed that four colors, that is, white which is a background color and green, red and yellow which are the figure colors are extracted. In the figure in which green and red are adjacent to each other, first and second colors are green and red, respectively. Then, since there is yellow, which is an intermediate color between green and red, the selecting section 3 selects a combination of green, yellow and red.

The boundary strength calculating section 2 calculates a boundary strength for each color component in the example. Assuming that the color components are red, green and blue, a change in boundary strength appears for each color component. For the red component, a value of the boundary strength in a boundary part of the green figure portion is greater than values in the other parts. For the green component, a value of the boundary strength in a boundary part of the red figure portion is greater than values in the other parts. For the blue component, values of the boundary strengths in a boundary part of the graphic in which red and green are adjacent to each other and in a boundary part of the yellow figure are greater than values in the other parts.

Figure 7C:
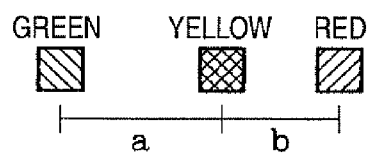

The color replacing section 4 sets a threshold for the boundary strength in accordance with an internal division ratio (a:b in. FIG. 7C) in which yellow (an example of the intermediate color) divides a distance in the color space between green (an example of the first color) and red (an example of the second color). Alternatively, a preset threshold may be used as the threshold. Then, the set threshold is compared with the boundary strength calculated by the boundary strength calculating section 2 to determine as to whether or not the pixel in interest is a pixel in the boundary.

The foreground determining section 1 determines as to whether each pixel in the image to be processed is a pixel in the foreground or a pixel in the background, and passes a determination result to the color replacing section 4. In the example, the figure part in which green and red are adjacent to each other and the yellow figure part are determined to be the foreground, and the other parts are determined to be the background, and these determination results are sent to the color replacing section 4.

Figure 7D:
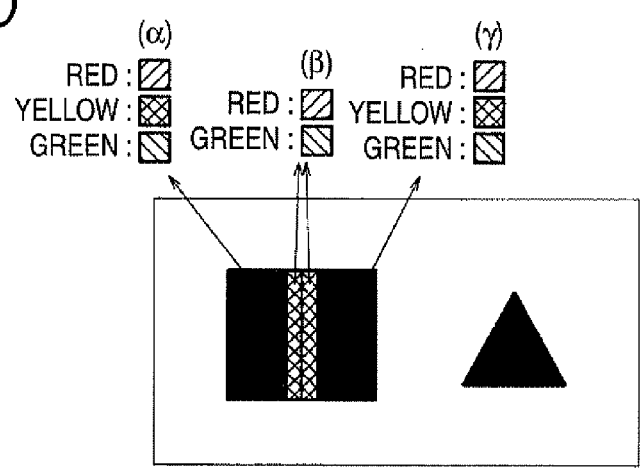

The color replacing section 4 selects replacement color candidates in accordance with the determination criterion shown in FIG. 4, the determination result for the boundary strength, and the determination result(s) made by the foreground determining section 1, for example. In FIG. 7D, a part which has been determined by the foreground determining section 1 to be the foreground is indicated in black, and a part which has been determined to be the boundary between green and red is indicated by a shaded portion. Since both of the green and red portions are also determined to be the foreground, both of them are shown in black. However, the boundary strengths in the boundary part take great values. Therefore, the boundary part is determined to be a boundary and is indicated by the shaded portion.

At first, an inner part of each of the green and red parts is not the boundary part but the foreground. Therefore, according to the determination criterion shown in FIG. 4, the intermediate color as well as the first and second colors are set as the replacement color candidates. In the example, accordingly, the replacement color candidates are green, yellow and red (($\alpha$) and ($\gamma$) in FIG. 7D). White which is the background color may be included in the replacement color candidates. Although a part which is the green boundary and a part which is the red boundary are present in the boundary part between green and red, the first and second color excluding the intermediate color are set as the replacement color candidates for both of the green and red boundaries, in accordance with the determination criterion shown in FIG. 4. In the example, accordingly, the replacement color candidates are green and red (($\beta$) in FIG. 7D).

Figure 7E:
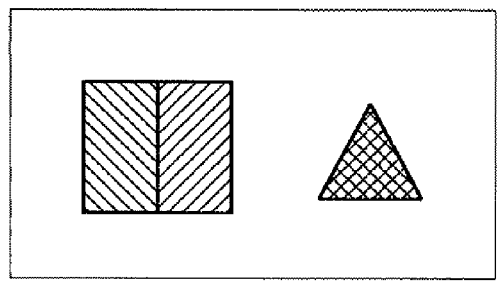

The pixel in interest is replaced by any of the colors of the replacement color candidates. For example, the pixel in interest may be replaced by the color of the replacement color candidate which has the smallest distance in the color space. Thereby, the inner parts of the green and red figures are replaced by "green" and "red", respectively. For the boundary part between green and red, yellow is present as described with reference to FIG. 7B. In the boundary part, however, the replacement color candidates are "green" and "red". Therefore, each color of the boundary part is replaced by the color having small distances, that is, colors of pixels in the green-side boundary part are replaced by "green", and colors of pixels in the red-side boundary part are replaced by "red". Thereby, a result of the color limitation shown in FIG. 7E is obtained. In FIG. 7E, the yellow portion which is present on the boundary between green and red in FIG. 7B is eliminated.

In the example, the four colors, that is, white, green, red and yellow are extracted as the representative colors. Therefore, if green and red are selected as the first and second colors, the intermediate color is present, while if the other colors are selected as the first and second colors, no intermediate color is present. Accordingly, the replacement color candidates for the boundary part between green and red are limited, and colors of the other boundary parts are replaced by either of the two colors.

Figure 8A:
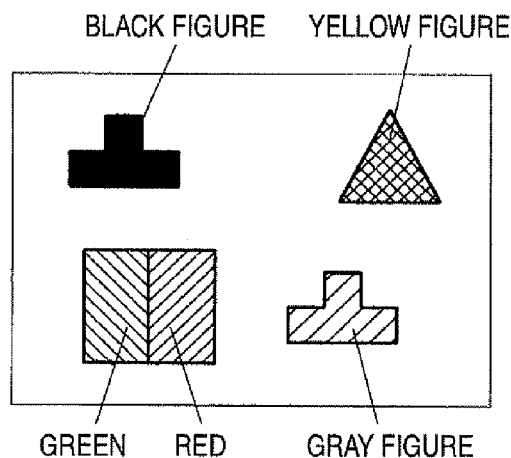
FIGS. 8A to 8E are views for explaining a third specific example of the limitation processing according to the exemplary embodiment of the invention.
Figure 8B:
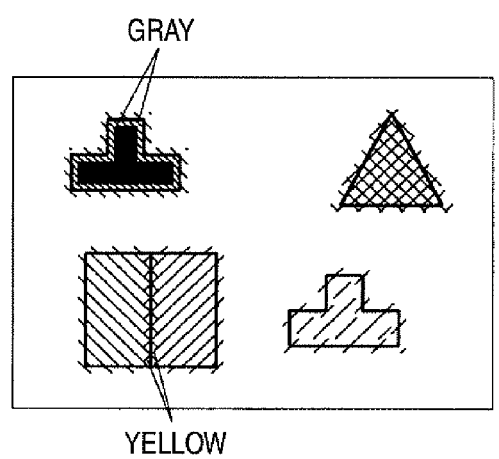

FIGS. 8A to 8E are views for explaining a third specific example of the limitation processing according to the invention. In the example, the example shown in FIG. 6A and the example shown in FIG. 7A are mixed in an original. FIG. 8A shows one example of the original. For convenience of illustration, different colors are indicated by different types of slant lines, respectively. FIG. 8B shows an image obtained by reading the original through an image reading device. The image is an image to be processed.

Figure 8C:
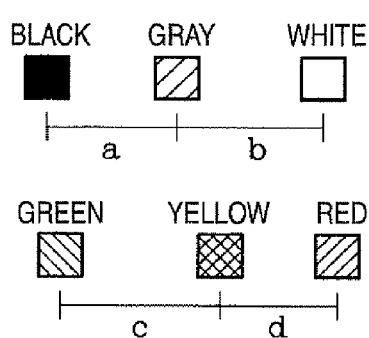

Representative colors for a color limitation are extracted from the image to be processed, and it is assumed that six colors, that is, white color which is a background color and black, gray, green, red and yellow which are figure colors are extracted as shown in FIG. 8C. In this case, combinations in each of which an intermediate color between two colors is present include two combinations, that is, (i) a combination of black, gray and white and (ii) a combination of green, yellow and red. The selecting section 3 refers to a color of a pixel in interest or a region, in the image to be processed, having a preset size and including the pixel in interest, and determines whether the color of the pixel in interest is included in any of the combinations or in none of the combinations. If the color of the pixel in interest is included in one of the combinations, the selecting section 3 selects the one combination.

The selecting section 3 may make this determination, for example, by creating a histogram in the color space from colors of pixels in a local region having a predetermined size and including the pixel to be replaced and selecting any of the combination based on a color distribution. For example, in a black figure or a gray figure, the color distribution in the local region has peaks in white, gray and black. Therefore, a combination of black, gray and white is selected. Also, in a graphic in which green and red colors are adjacent to each other or a yellow graphic, a peak is present in green, red and/or yellow. Therefore, a combination of green, yellow and red is selected.

The boundary strength calculating section 2 calculates a boundary strength for each color component in the example. It is assumed that the color components include red, green and blue. For the red component, in a green figure part, a boundary part of a black figure and a boundary part of a gray figure, values of the boundary strengths are greater than values in the other parts. For the green component, values of the boundary strengths in a red figure part, the boundary part of the black figure, and the boundary part of the gray figure are greater than values of the other parts. For the blue component, values of the boundary strengths in the graphic in which green and red are adjacent to each other, a boundary part of a yellow figure, the boundary part of the black figure and the boundary part of the gray figure are greater than values in the other parts.

The color replacing section 4 sets a threshold which is used in determination based on a boundary strength and which corresponds to the combination selected by the selecting section 3. In case of any combination, the color replacing section 4 may set the threshold for the boundary strength in accordance with an internal division ratio in which the intermediate color divides a distance in the color space between the first and second colors. As the threshold, a threshold which is preset for each combination or a threshold which is uniformly preset may be used. The set threshold is compared with the boundary strength calculated by the boundary strength calculating section 2 to determine as to whether or not the pixel in interest is a boundary pixel.

The foreground determining section 1 determines as to whether each pixel in the image to be processed is a pixel in the foreground or in the background, and passes a determination result to the color replacing section 4. In the example, respective parts of the black figure, the gray figure, the graphic in which green and red are adjacent to each other, and the yellow graphic are determined to be the foreground, and the other parts are determined to be the background.

Figure 8D:
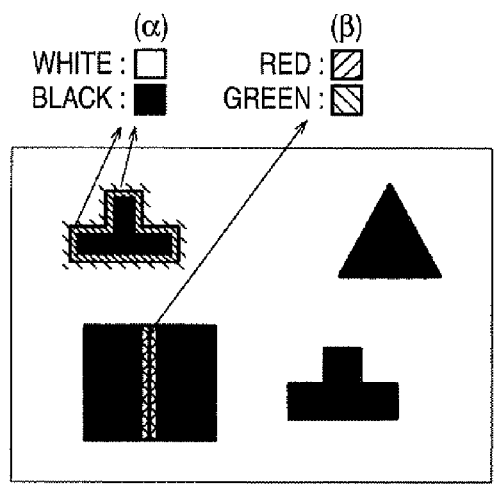
Figure 8E:
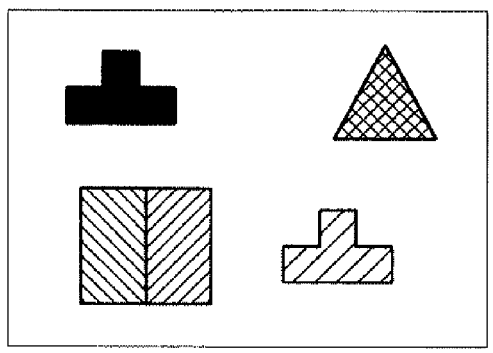

The color replacing section 4 selects replacement color candidates in accordance with the determination criterion shown in FIG. 4, the determination result for the boundary strength, and the determination result made by the foreground determining section 1, for example. In FIG. 8D, parts which have been determined by the foreground determining section 1 to be the foreground are shown in black. Also, parts which have been determined to be the boundary part based on the boundary strength are indicated by shaded portions. The boundary part of the black figure is determined to be a boundary between black and white, and the boundary part between green and red is also determined to be a boundary.

For the black figure, the replacement color candidates are limited in its boundary part so that the replacement color candidates are set to be black and white. Therefore, even if gray is present in the boundary part of the black figure, the color of the pixel to be replaced is replaced by black or white. Moreover, the replacement color candidates are also limited in the boundary part between green and red in the graphic in which green and red are adjacent to each other, and the replacement color candidates are set to be green and red. Therefore, even if yellow in which both of green and red are mixed is present in the boundary part between green and red, a color of the pixel to be replaced is replaced by green or red. In the other parts, the replacement color candidates are not limited, and a color of the pixel in interest may be replaced by a representative color having the smallest distance in the color space from the color of each pixel in interest. Thus, a result of the color limitation shown in FIG. 5E is obtained. A gray part which appears in the boundary part of the black figure in FIG. 8B is eliminated in FIG. 8E. Also, the yellow part which is present on the boundary between green and red is eliminated.

In the description of the third specific example, it is assumed that the selecting section 3 executes the process for determining as to whether the color of the process to be processed is included in either the combination of black, gray and white or the combination of green, yellow and red which serving as the combination having the intermediate color between the two colors (or is included in none of them). However, the invention is not limited thereto. This process may be performed by the color replacing section 4 as described with reference to FIG. 5. In this case, the selecting section 3 outputs the combination of black, gray and white and the combination of green, yellow and red to the color replacing section 4. The color replacing section 4 may create a histogram in the color space from colors of pixels in a local region having a predetermined size and including the color of the pixel to be replaced and select any of the combination based on a color distribution as described above, for example. Alternatively, the color replacing section 4 may calculate a changing direction of a color in the color space by using a vector having, as its components, boundary strengths of the respective color components which are calculated by the boundary strength calculating section 2, and select a combination based on the changing direction of the color. For example, in the boundary part of the black or gray figure, values of significant boundary strengths are calculated for all of the color components. In the part in which green and red are adjacent to each other, values of significant boundary strengths are calculated for green and red. By using a vector based on the values of the boundary strengths for the respective color components, thus, it is possible to know which colors are adjacent. Based thereon, consequently, a combination of two colors and an intermediate color may be selected. The process after the selection of the combination is as described above.

Figure 9A:
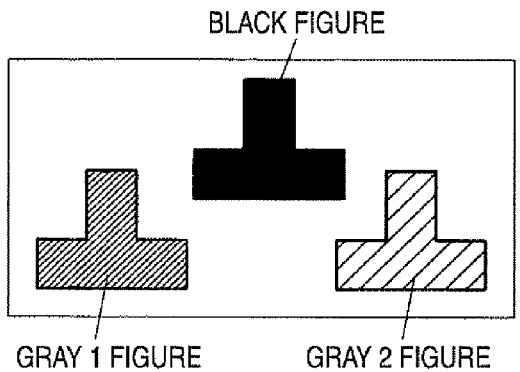
FIGS. 9A to 9E are views for explaining a fourth specific example of the limitation processing according to the exemplary embodiment of the invention.
Figure 9B:
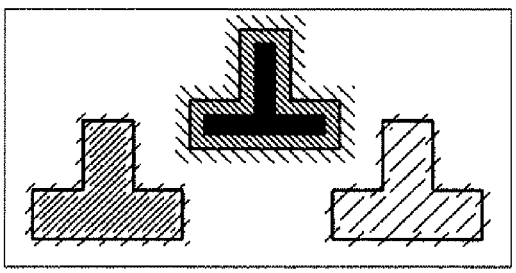

FIGS. 9A to 9E are views for explaining a fourth specific example of the limitation processing according to the exemplary embodiment of the invention. Although description has been given on the case where the single intermediate color is present in the above specific examples, plural intermediate colors are present in some cases. In the fourth specific example, description will be given on the case where two intermediate colors are present. As a simple example for the case, description will be given on an example where a black figure and two gray figures having different densities are drawn as shown in FIG. 9A illustrating an example of an original. For convenience of the description, of the two gray colors, a dark gray will be referred to as "gray 1", and light gray will be referred to as "gray 2". In FIGS. 9A to 9E, each gray region is indicated by a shaded portion corresponding to its density. FIG. 9B shows an image obtained by reading the original through an image reading device. It is assumed that the image is an image to be processed.

Figure 9C:
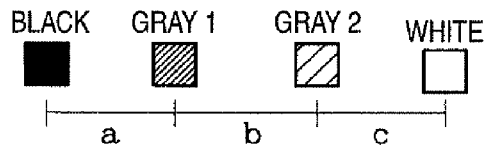

Representative colors for a color limitation are extracted from the image to be processed, and it is assumed that four colors, that is, white which is a background color and black, gray 1 and gray 2 which are the figure colors are extracted as shown in FIG. 9C. Herein, the selecting section 3 selects a combination of black which is a first color, white which is a second color, and gray 1 and gray 2 which are intermediate colors.

The boundary strength calculating section 2 calculates a boundary strength in a vector direction that connects black and white in the color space. In boundary parts of the respective figures, a boundary strength corresponding to each color is calculated.

The color replacing section 4 sets a threshold for the boundary strength in accordance with an internal division ratio (a:b:c in FIG. 9C) in which gray 1 and gray 2 (examples of the intermediate colors) divide a distance in the color space between black (an example of the first color) and white (an example of the second color). The number of the set thresholds is equal to or smaller than the number of the intermediate colors. In the example, two thresholds are set. For instance, the color replacing section 4 may set one of the thresholds in accordance with an internal division ratio of a:(b+c), and set the other threshold in accordance with an internal division ratio of (a+b):c. As a matter of course, preset threshold(s) may be used as the threshold. The set thresholds are compared with the boundary strength calculated by the boundary strength calculating section 2 to determine how large the boundary strength is as the white boundary and how large the boundary strength as the black boundary.

The foreground determining section 1 determines as to whether each pixel in the image to be processed is a pixel in a foreground or in a background, and passes a determination result to the color replacing section 4. In the example, the black figure and the two gray figures are determined to be the foreground, and the other parts are determined to be the background, and these determination results are sent to the color replacing section 4.

The color replacing section 4 selects replacement color candidates in accordance with a preset determination criterion, the determination result of the boundary strength, and the determination results by the foreground determining section 1. FIG. 10 is a table for explaining another example of the determination criterion in selection of the replacement color candidates. In the example of the determination criterion shown in FIG. 10, determination is made to classify the boundary strengths into "high", "middle" and "low" with two thresholds being set for the boundary strength. If the boundary strength is high, it can be supposed that the color to be processed is in a boundary between white and black. In this case, accordingly, the replacement color candidates are limited to white and black. If the boundary strength is middle, it cannot be supposed that the pixel in interest is in the boundary between white and black, but it can be supposed that the pixel in interest is in a boundary between white and gray 1. In this case, therefore, the replacement color candidates are limited to white and gray 1. If the boundary strength is low and if the pixel in interest in the foreground, a combination of white, gray 2, gray 1 and black of the representative colors is set to the replacement color candidates in accordance with the determination result made by the foreground determining section 1. If the pixel in interest is in the background, four colors of white, gray 2, gray 1 and black may be set to the replacement color candidates, or the replacement color candidates may be limited to white and gray 2 because of the background.

Figure 9D:
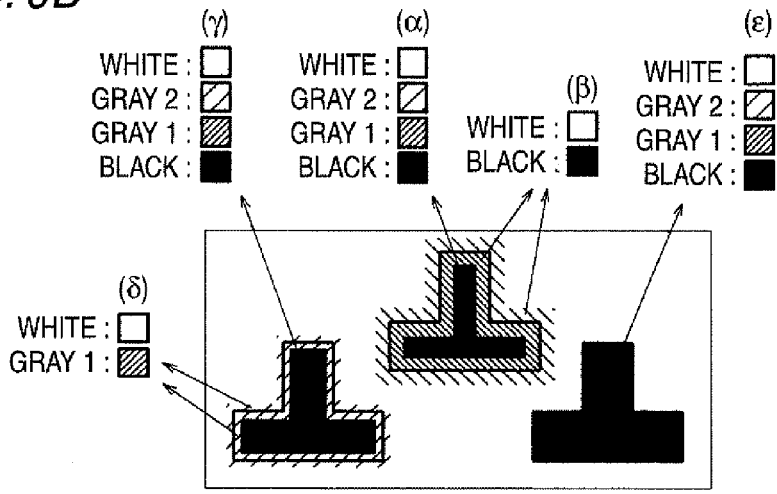

In FIG. 9D, parts which have been determined by the foreground determining section 1 to be the foreground is shown in black, and parts which have been determined to be the boundaries are shown by slant lines. Both the black figure and the two gray figures shown in FIG. 9A are also determined to be the foreground. Therefore, all of the figures are shown in black. For the black figure, the boundary strengths are determined to be high in its boundary part. For the gray 1 figure, the boundary strengths are determined to be middle in its boundary part. For the gray 2 figure, the boundary strengths are determined to be low even in its boundary part. For this reason, no boundary part of the gray 2 figure is shown by a shaded portion.

First of all, an inner part of each figure is not the boundary part but the foreground. Therefore, black, gray 1, gray 2 and white are set to be the replacement color candidates based on the determination criterion shown in FIG. 10 (($\alpha$), ($\gamma$) and ($\epsilon$)). In accordance with the colors of the inner parts in the respective figures, colors of the black, gray 1 and gray 2 figures are placed by black, gray 1 and gray 2, respectively.

Moreover, the boundary part of the black figure includes a boundary part which is in the foreground and a boundary part which in the boundary. Since the boundary strength in the boundary part of the black figure is high, black and white are set to the replacement color candidates in accordance with the determination criterion shown in FIG. 10 (see ($\beta$)). Accordingly, even if a color of the boundary part which is in the foreground is gray 1 or gray 2, it is replaced by black. Also, even if a color of the boundary part which is in the background is gray 1 or gray 2, it is replaced by white.

The boundary part of the gray 1 figure includes a boundary part which is in the foreground and a boundary part which is in the background. Since the boundary strength in the boundary part of the gray 1 is middle, gray 1 and white are set to the replacement color candidates in accordance with the determination criterion shown in FIG. 10 (see ($\delta$)). Accordingly, even if a color of the boundary part which is in the foreground is gray 2, it is replaced by gray 1. Also, even if a color of the boundary part which is in the background is gray 2, it is replaced by white.

For the gray 2 figure (including its boundary part), the boundary strength is determined to be low. In the foreground part, therefore, black, gray 1, gray 2 and white are set to the replacement color candidates. However, since the figure is originally in gray 2, its color is not replaced by black or gray 1. Even if an intermediate color between gray 2 and white is present in the boundary part, it is not replaced by gray 2 or white.

Figure 9E:
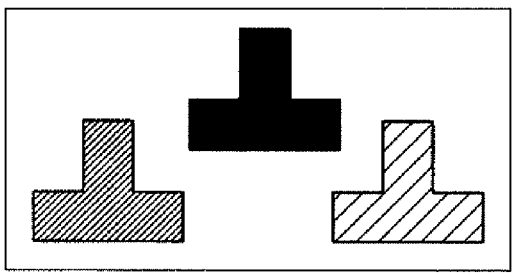

For the background part, in accordance with the determination criterion shown in FIG. 10, gray 2 and white are set to the replacement color candidates, and colors of the background part are replaced by either of gray 2 and white. Also, in the case where the background has unevenness or a noise is present in the background, if one part is determined to be in the background and if its background strength is determined to be low, a color of the one part is replaced by gray 2 or white. Accordingly, a result of the color limitation shown in FIG. 9E is obtained.

Although description has been given on the case where two intermediate colors are present in the fourth specific example, three or more intermediate colors may be present in some cases. In those cases, the boundary strengths may be classified by using thresholds the number of which is equal to or smaller than the number of the intermediate colors, and replacement color candidates corresponding to each classification or the classification and the determination result of the foreground may be obtained, and a color of a pixel in interest may be replaced.

Although the fourth specific example has been shown as a modification of the first specific example, plural intermediate colors may present in the case where different colors are adjacent to each other as in the second specific example. In this case, the above described processes may be performed. As a matter of course, in some cases, as described in the third specific example, plural combinations of the first color, the second color and the intermediate color may be present. The number of the intermediate colors which are present may vary depending on the combinations. Based on a color of a pixel in interest or a color in a preset region which is in an image to be processed and which includes the pixel in interest, it is determined which combination the pixel in interest corresponds to or whether the pixel in interest corresponds to none of the combinations. If the pixel in interest corresponds to one of the combinations, the process may be performed in response to the one of the combinations.

Figure 11:
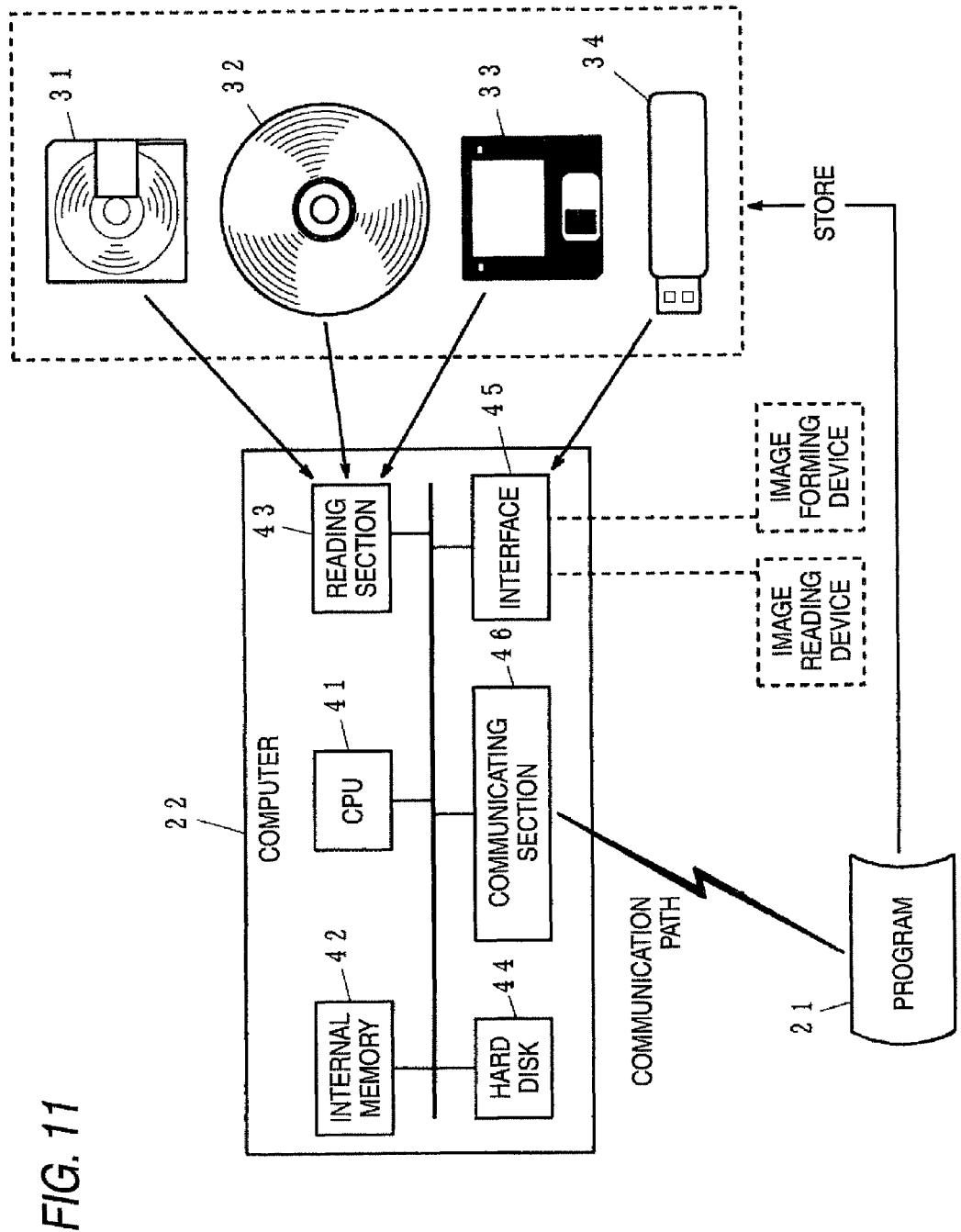
FIG. 11 is a diagram for explaining an example of a computer program in the case where functions described in the exemplary embodiment according to the invention is implemented by the computer program, a storage medium which stores the computer program, and a computer.

FIG. 11 is a diagram for explaining an example of a computer program, a storage medium storing the computer program and a computer in the case where the functions described in the exemplary embodiment of the invention is implemented by the computer program. In FIG. 11, reference numeral 21 denotes a program, reference numeral 22 denotes a computer, reference numeral 31 denotes a magneto-optical disk, reference numeral 32 denotes an optical disk, reference numeral 33 denotes a magnetic disk, reference numeral 34 denotes a memory, reference numeral 41 denotes a CPU, reference numeral 42 denotes an internal memory, reference numeral 43 denotes a reading section, reference numeral 44 denotes a hard disk, reference numeral 45 denotes an interface, and reference numeral 46 denotes a communicating section.

It is also possible to implement all or a part of the functions in the respective sections described in the exemplary embodiment of the invention by the computer executable program 21. In that case, the program 21 and data to be used by the program 21 may be stored in a computer readable storage medium. The storage medium serves to bring a state of a change in energy such as a magnetism, light or electricity depending on contents of description of a program with respect to the reading section 43 provided in a hardware resource of a computer and to transmit the contents of the description of the program to the reading section 43 in a format of a corresponding signal thereto. For example, the storage medium includes the magneto-optical disk 31, the optical disk 32 (containing a CD and a DVD), the magnetic disk 33 and the memory 34 (containing an IC card and a memory card). As a matter of course, the storage media are not always portable.

The program 21 is stored in the storage media, and the storage media are placed in the reading section 43 or the interface 45 in the computer 22, for example. Consequently, the program 21 is read from the computer 22 and is stored in the internal memory 42 or the hard disk 44, and the program 21 is executed by the CPU 41. Thus, all or a part of the functions described in the exemplary embodiment of the invention are implemented. Alternatively, the same functions may be implemented by transferring the program 21 to the computer 22 through a communication path and receiving the program 21 through the communicating section 46 in the computer 22, and storing the program 21 in the internal memory 42 or the hard disk 44 and executing the program 21 through the CPU 41.

Various devices may further be connected to the computer 22 through the interface 45. For example, a display device for displaying information or a receiving device for receiving information from a user may be connected thereto. Moreover, an image forming device serving as an output device may be connected thereto through the interface 45, and an image subjected to the color limitation is formed by the image forming device, for example. Alternatively, an image reading device may be connected thereto through the interface 45, and an image read by the image reading device is set to be an image to be processed to carry out a color limitation process, thereby reducing a data volume, and the data are stored in the hard disk 44 or are transmitted to an outside through the communicating section 46. Alternatively, the image reading device and the image forming device may be connected to the interface 45, and an image read by the image reading device is subjected to a color limitation process to form an image through the image forming device.

As a matter of course, it is also possible to have a partial structure in hardware or to have a whole structure in the hardware. Alternatively, a program which wholly or partially includes the functions described in the exemplary embodiment of the invention may be configured together with the other configurations. It is also possible to constitute a single program together with a control program in an apparatus including an image reading device and an image forming device, for example, a copying machine or to constitute a single program together with the control program in an apparatus including an image forming device, for example, a printer. As a matter of course, in case of an application to other uses, it is also possible to carry out an integration with a program in the same uses.

What is claimed is:

1. An image processing apparatus comprising:
a selecting unit that, when M representative colors comprise first and second colors, and N intermediate color between the first and second colors, selects the first color, the second color and the N intermediate color, wherein M and N denote natural numbers, N≧1 and N<M−2;
a boundary strength calculating unit that calculates a boundary strength indicating a color difference or brightness difference at a pixel of the image to be processed; and
a color replacing unit that determines replacement color candidates for the pixel from among the first color, the second color and the N intermediate color, and replaces a color of the pixel with any of the replacement color candidates, wherein the replacement color candidates are determined in accordance with the boundary strength of the pixel calculated by the boundary strength calculating unit.

2. The image processing apparatus according to claim 1, wherein the color replacing unit controls a threshold value in accordance with an internal division ratio in which the N intermediate color divides a distance between the first and second colors in a color space,
the color replacing unit determines if the pixel constitutes a boundary in the image to be processed, based on the boundary strength of the pixel and the controlled threshold value, and
the color replacing unit determines the replacement color candidates from among the first color, the second color and the N intermediate color in accordance with a result of determining if the pixel constitutes the boundary.

3. The image processing apparatus according to claim 1, wherein the selecting unit selects the first and second colors based on a color histogram of a local region including the pixel.

4. The image processing apparatus according to claim 2, wherein the selecting unit selects the first and second colors based on a color histogram of a local region including the pixel.

5. The image processing apparatus according to claim 1, wherein the color replacing unit determines a color of a local region including the pixel based on a characteristic of the local region and determines the replacement color candidates based on a result of the determination of the color of the local region.

6. The image processing apparatus according to claim 2, wherein the color replacing unit determines a color of a local region including the pixel based on a characteristic of the local region and determines the replacement color candidates based on a result of the determination of the color of the local region.

7. The image processing apparatus according to claim 1, further comprising:
a foreground determining unit that determines as to whether the pixel is a pixel of a foreground or a pixel of a background, wherein
when the second color is a background color, the color replacing unit replaces, with the second color, the color of the pixel which is determined by the foreground determining unit to be the background.

8. The image processing apparatus according to claim 2, further comprising:
a foreground determining unit that determines as to whether the pixel is a pixel of a foreground or a pixel of a background, wherein
when the second color is a background color, the color replacing unit replaces, by the second color, the color of the pixel which is determined by the foreground determining unit to be the background.

9. The image processing apparatus according to claim 3, further comprising:
a foreground determining unit that determines as to whether the pixel is a pixel of a foreground or a pixel of a background, wherein
when the second color is a background color, the color replacing unit replaces, by the second color, the color of the pixel which is determined by the foreground determining unit to be the background.

10. The image processing apparatus according to claim 4, further comprising:
a foreground determining unit that determines as to whether the pixel is a pixel of a foreground or a pixel of a background, wherein
when the second color is a background color, the color replacing unit replaces, by the second color, the color of the pixel which is determined by the foreground determining unit to be the background.

11. The image processing apparatus according to claim 5, further comprising:
a foreground determining unit that determines as to whether the pixel is a pixel of a foreground or a pixel of a background, wherein
when the second color is a background color, the color replacing unit replaces, by the second color, the color of the pixel which is determined by the foreground determining unit to be the background.

12. The image processing apparatus according to claim 6, further comprising:
a foreground determining unit that determines as to whether the pixel is a pixel of a foreground or a pixel of a background, wherein
when the second color is a background color, the color replacing unit replaces, by the second color, the color of the pixel which is determined by the foreground determining unit to be the background.

13. A non-transitory computer-readable medium storing a program that causes a computer to execute image processing, the image processing comprising:
when M representative colors comprise first and second colors, and N intermediate color between the first and second colors, selecting the first color, the second color and the N intermediate color, wherein M and N denote natural numbers, $N \geq 1$ and $N < M-2$;
calculating a boundary strength indicating a color difference or brightness difference at a pixel of the image to be processed;
determining replacement color candidates for the pixel from among the first color, the second color and the N intermediate color in accordance with the calculated boundary strength of the pixel; and
replacing the color of the pixel with any of the replacement color candidates.

14. The non-transitory computer-readable medium according to claim 13, the image processing further comprises
controlling a threshold value in accordance with an internal division ratio in which the N intermediate color divides a distance between the first and second colors in a color space, and
determining if the pixel constitutes a boundary in the image to be processed, based on the boundary strength of the pixel and the controlled threshold value, and the determining of the replacement color candidates determines the replacement color candidates from among the first color, the second color and the N intermediate color in accordance with a result of the determining if the pixel in interest constitutes the boundary.

15. The non-transitory computer-readable medium according to claim 13, wherein the image processing further comprises
selecting the first and second colors based on a color histogram of a local region including the pixel.

16. The non-transitory computer-readable medium according to claim 13, wherein the image processing further comprises
determining a color of a local region including the pixel based on a characteristic of the local region, and
the determining of the replacement color candidates determines the replacement color candidates based on a result of the determining of the color of the local region.

17. The non-transitory computer-readable medium according to claim 13, wherein the image processing further comprises
determining as to whether the pixel is a pixel of a foreground or a pixel of a background, and
when the second color is a background color, the replacing replaces, with the second color, the color of the pixel which is determined to be the background.

18. An image processing method, comprising:
when M representative colors comprise first and second colors, and N intermediate color between the first and second colors, selecting the first color, the second color and the N intermediate color, wherein M and N denote natural numbers, $N \geq 1$ and $N < M-2$;
calculating a boundary strength indicating a color difference or brightness difference at a pixel of the image to be processed;
determining replacement color candidates for the pixel from among the first color, the second color and the N intermediate color in accordance with the calculated boundary strength of the pixel; and
replacing the color of the pixel with any of the replacement color candidates.

19. The image processing method according to claim 18, further comprising:
controlling a threshold value in accordance with an internal division ratio in which the N intermediate color divides a distance between the first and second colors in a color space; and
determining if the pixel constitutes a boundary in the image to be processed, based on the boundary strength of the pixel and the controlled threshold value, wherein
the determining of the replacement color candidates determines the replacement color candidates from among the first color, the second color and the N intermediate color in accordance with a result of the determining if the pixel in interest constitutes the boundary.

20. The image processing method according to claim 18, further comprising:
selecting the first and second colors based on a color histogram of a local region including the pixel.

* * * * *